Jan. 20, 1970  R. P. SORENSEN  3,490,196
PACKAGING APPARATUS
Filed Aug. 21, 1967  3 Sheets-Sheet 1
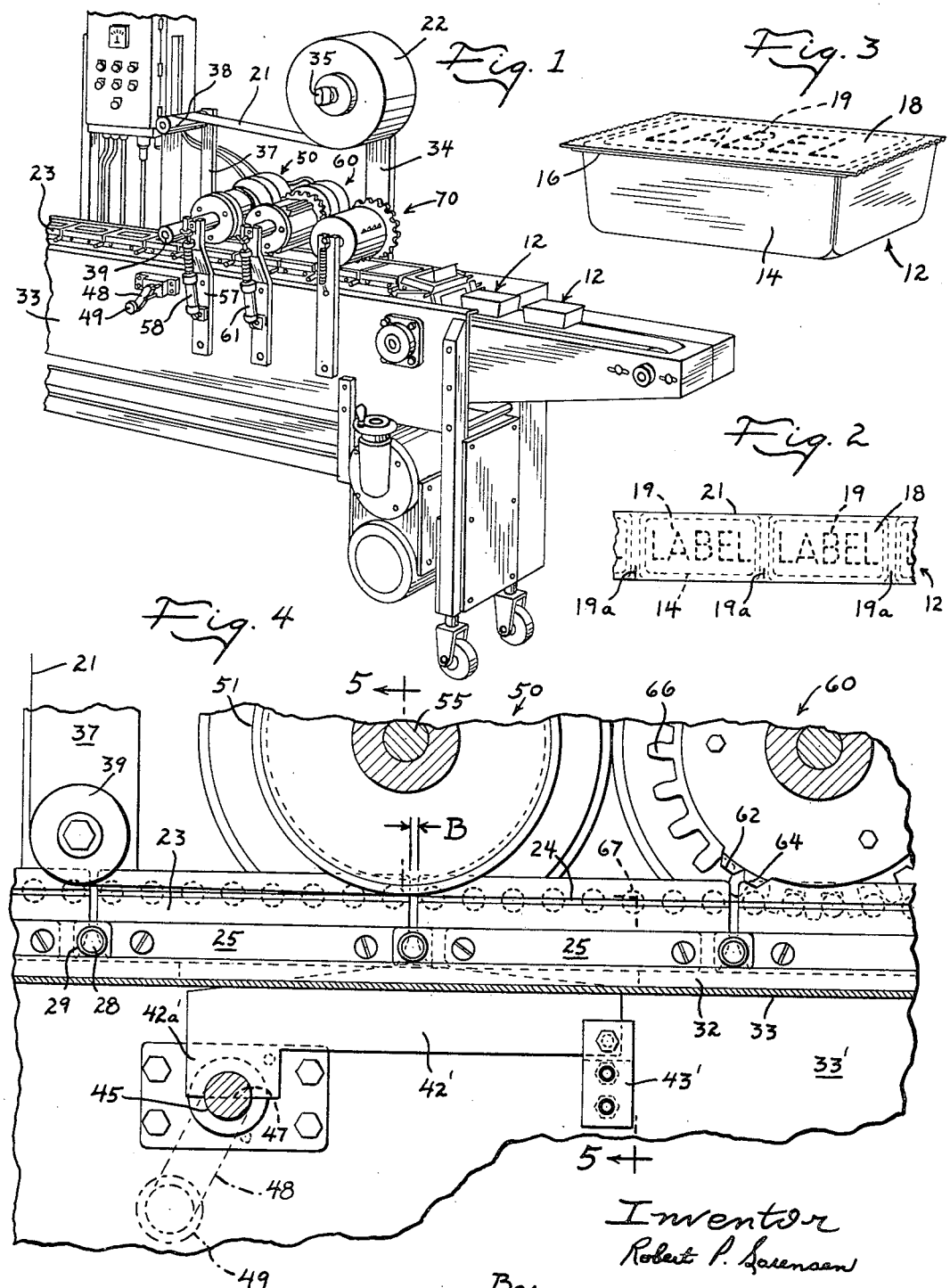
Inventor
Robert P. Sorensen
By McCanna, Mausbach & Pilote
Attys

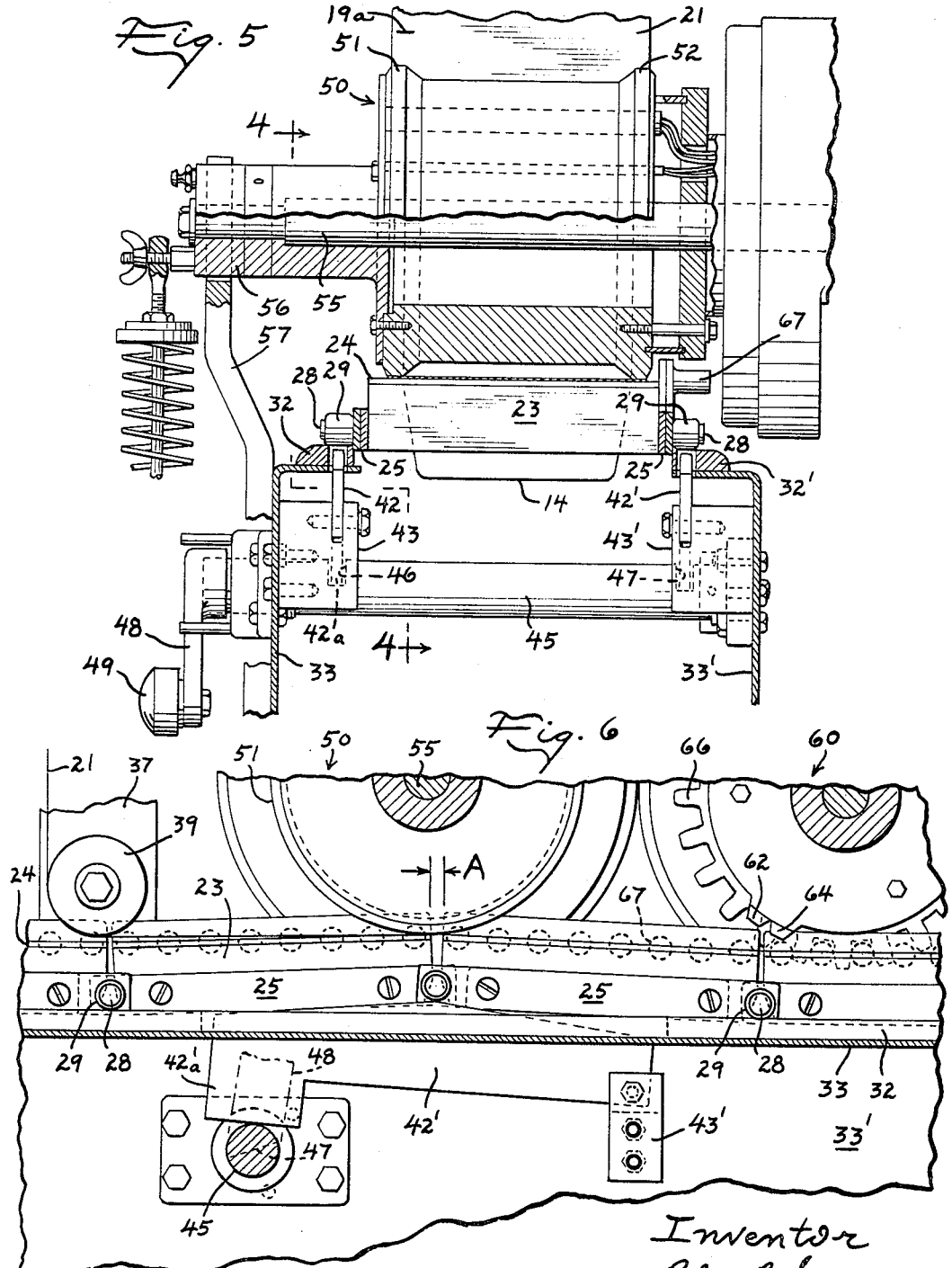

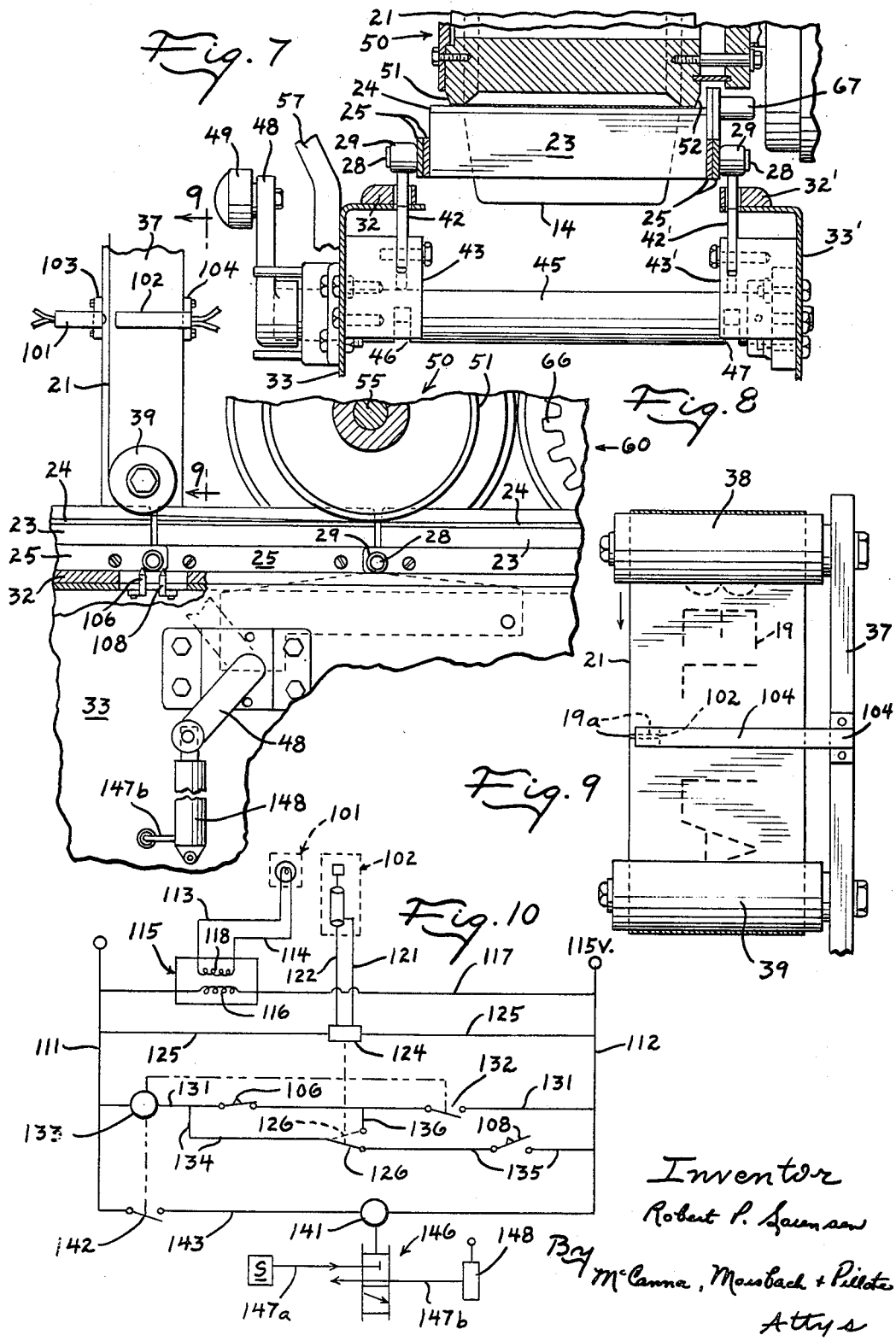

United States Patent Office 3,490,196
Patented Jan. 20, 1970

3,490,196
PACKAGING APPARATUS
Robert P. Sorensen, Rockford, Ill., assignor to Anderson Bros. Mfg. Co., Rockford, Ill., a corporation of Illinois
Filed Aug. 21, 1967, Ser. No. 662,133
Int. Cl. B65b 57/00, 57/02, 57/18
U.S. Cl. 53—51                    10 Claims

ABSTRACT OF THE DISCLOSURE

A plurality of open-topped containers are continuously advanced by a conveyor having pivotally connected pockets at preselected spacing. A continuous strip of cover material having spaced labels thereon is fed to a position overlying the containers for registry therewith. The pockets are pivoted to change the effective spacing of the tops of the containers and adjust the containers relative to the labels and effect the desired registry. In one form, a photo-electric sensor senses the registry of the labels and controls the pivoting of the pockets. A rotary sealing head seals the strip to the longitudinal sides of the container while the pockets are pivoted, the pockets are then returned to their original position, and the transverse sides are sealed by a second rotary sealing head driven by the conveyor.

BACKGROUND

This invention pertains to apparatus for properly positioning containers and a cover material having labels thereon relative to each other, and for sealing the cover material to the containers.

In packaging, a continuous strip of cover material is often sealed to containers. The use of such a strip introduces the problem of positioning the printed labels relative to the containers to be sealed. The strip is usually under tension, and there will be, at times, a tendency toward film stretching. The stretching can vary depending on various factors, one of which is the type of cover material. Additionally, there may be inadvertent variations in printing of the labels on the strip. The net effect is that the label is not centered on each container and, therefore, the package suffers in appearance.

SUMMARY

The present invention relates generally to a packaging apparatus. More particularly, the present invention relates to a new and useful apparatus for proper positioning of containers relative to a cover material having surface markings thereon and for sealing the cover material to the containers.

It is a general object of the present invention to provide a new and useful apparatus for effecting registry of containers with surface markings on a cover material.

Another object is to provide apparatus which compensates for stretching in the strip of cover material or for variations in the labels printed thereon to position the containers and labels in proper registry.

Still another object of this invention is to provide apparatus for changing the effective spacing of containers to effect proper registry with surface markings carried on a continuous strip of cover material.

Another object is to provide apparatus in accordance with any of the preceding objects and including automatically detecting the alignment of the cartons and labels, and compensating for deviations therein within preselected limits.

Yet another object of the present invention is to provide apparatus for sealing a continuous cover material to containers.

These, together with other objects and advantages of the invention, will become apparent as the invention becomes better understood from the following description and the accompanying drawings.

DRAWINGS

FIGURE 1 is a partial perspective view of a machine incorporating the apparatus of the present invention and for performing the steps of the method;

FIG. 2 is a plan view of a row of packages formed by the method of this invention;

FIG. 3 is a perspective view of one package severed from the row of FIG. 2;

FIG. 4 is a longitudinal sectional view of a portion of the apparatus of FIG.1 and taken generally along line 4—4 of FIG. 5;

FIG. 5 is a cross-sectional view taken generally along line 5—5 of FIG. 4;

FIGS. 6 and 7 are views corresponding to FIGS. 4 and 5, respectively, but illustrating some of the parts in a moved position;

FIG. 8 is a partial elevational view illustrating the apparatus modified by an automatic control system;

FIG. 9 is a view taken generally along line 9—9 of FIG. 8; and

FIG. 10 is a schematic view of the circuitry of the automatic control system.

DESCRIPTION

The method of the present invention is for forming packages such as illustrated in FIG. 3 and generally designated by the numeral 12. In the embodiment illustrated, the package 12 includes an open-topped, generally rectangular container 14 having an outwardly extending peripheral flange 16 and a cover sheet 18 extending across the top of the container and secured thereto. The cover sheet 18 has a surface marking which may include a label 19 preferably disposed in predetermined registry with the container 14. Advantageously, a plurality of individual containers 14 are advanced in a predetermined spaced relationship. A longitudinally extending strip 21 of cover material is withdrawn from a roll 22 and fed to a position overlying the containers 14. As best seen in FIG. 2, the strip 21 has a plurality of the surface markings thereon which may be achieved by printing or the like. As previously explained, it is preferable that the labels 19 be placed in a predetermined position relative to the upper surface of the containers. For this purpose, the surface marking includes indicator marks 19a advantageously located to fall in the space between adjacent containers. When the registry of the surface markings relative to the cups begins to fall outside of predetermined limits, as when the surface markings begin to "lag" behind the containers by more than a predetermined amount, the effective spacing of the containers at the tops thereof is increased slightly to take up excess cover material. This step is continued until the "lag" has been taken up, thus keeping the registration within desired limits.

Simultaneously with varying the effective spacing of the containers 14, at least a portion of the strip 21 is sealed to the containers. Advantageously, the sealing is performed in two steps. First, the strip 21 is sealed to the longitudinal flanges of the rectangular containers. Thereafter, the spacing of the containers is returned to the original position, and the strip is sealed to the transverse sides of the containers by a sealing head driven correlative to the movement of the containers and thus in synchronization therewith. The strip 21 is thereafter severed to separate the packages 12.

A preferred embodiment of the present invention is illustrated in FIG. 1–7. In this embodiment, a plurality of pockets 23 are shaped for receiving the containers 14 and for supporting the flange 16 on the upper surface 24 of the pockets. The upper surface 24 advantageously comprises a layer of resilient and heat-insulating material to aid in the sealing operationg. Preferably, the pockets 23 are swingably connected together in end-to-end relationship to form an endless-type conveyor. This is conveniently accompilshed by pivotally connecting side plates attached to the pockets. As shown in FIG. 4, a plate 25 is attached to each pocket. Adjacent plates are pivotally connected by a pin connection 28 upon which is mounted a roller 29. A similar arrangement is provided at the other side of the pockets 23 (see FIGS. 5 and 7). It will be noted that the axes of the pins 28 are spaced below the upper surface 24 of the pockets and thus spaced from the uper surface of the conveyed containers 14. The upper flight of the conveyor is supported on rails 32, 32', which support the rollers 29. The apparatus thus far described and means for driving the conveyor, are disclosed in detail in the copending application, Ser. No. 554,284, filed May 24, 1966, and assigned to the assignee of the present invention. In general, the apparatus may include channel-shaped side members 33, 33' for supporting the rails. The apparatus may also include a denester (not shown) for placing the containers 14 into the pockets 23, and a filler (not shown) for depositing a quantity of material to be packaged into the containers. Thus, filled containers 14 may be advanced by the pockets 23.

The continuous web or strip 21 of cover material is fed from roll 22 to provide a cover to be sealed to the containers 14. Means is provided for positioning the strip 21 adjacent the top of the container 14 and, in the embodiment illustrated, an upwardly extending support 34 is mounted on the machine in any convenient manner and has a laterally extending shaft 35 for supporting roll 22. Another upright support 37 is similarly mounted on the machine and has laterally extending rollers 38 and 39 supported thereon. Strip 21 is passed over the rollers and is thereby positioned adjacent the tops of the containers for the sealing operation. Advantageously, container 14 is made of a material capable of having a cover heat-sealed thereto, and the strip 21 is a thermoplastic material of any type compatible with the containers. For example, strip 21 may be a sheet of synthetic resin, or a sheet of paper or the like coated with a thermosplastic material. In the preferred embodiment of the present invention, the center-to-center spacing of the pockets 23 is slightly less than the center-to-center spacing of the surface markings. Thus, there is a slight "lag" of the surface markings relative to the containers. Additionally, if a somewhat stretchable cover material is utilized, additional "lag"' may occur as the cover material is stretched and fed to the position overlying the containers. Slight irregularities in printing the surface markings 19, 19a may add or detract from the built-in "lag." As a consequence, means is provided to change the effective spacing of the pockets 23 at the tops thereof to adjust the registry of the containers 14 and the surface markings. For this purpose, the pockets 23 are pivoted about axis 28 as best shown in FIG. 6. The pivoting causes the effective spacing at the top to increase. Preferably, this increase is somewhat greater than the built-in "lag." In other words, the effective center-to-center spacing, when the pockets are pivoted, is greater than the center-to-center spacing of the surface markings 19, so that registry can be effected within desired limits.

To pivot the pockets 23, a cam 42 is pivotally connected to a block 43 on the side wall 33. An opening is provided through rail 32 to provide passage of the cam therethrough. At the other end of cam 42, is conveniently provided a downwardly extending leg 42a which is supported on a laterally extending rotatable shaft 45. Shaft 45 is rotatably supported on side walls 33, 33'. In a similar fashion, a second cam 42' is supported adjacent the other side wall 33' for operation simultaneously with cam 42. Shaft 45 has a pair of slots 46 and 47 (see FIG. 5) for supporting the other end of cams 42 and 42', respectively, in their retracted or lowered position. Shaft 45 is also provided with an arm 48 and a handle 49 conveniently located adjacent side wall 33. Operation of the handle can rotate the shaft from the position illustrated in FIGS. 4 and 5 to the position illustrated in FIGS. 6 and 7. When the shaft 45 is rotated, the legs 42a, 42a' of the cams 42, 42' are forced out of the slots 46, 47, and the inclined upper surface of the cam is raised to a level above the level of the rails 32. This, then, creates a ramp along which the rollers 29 travel and cause the pivoting of adjacent pockets 23, as can be seen in FIG. 6. This pivoting about an axis disposed below the upper level of the pockets causes the effective spacing to increase as shown by the dimension indicated at A in FIG. 6. It can be seen that dimension A is greater than the usual spacing of the pockets as indicated at B in FIG. 4. After the desired registry has been effected, an operator may return the shaft 45 to its initial position and allow the rollers 29 to run along rails 32, 32' in the ordinary fashion until such time as adjustment of registry is again necessary.

Preferably, the strip 21 is sealed to the containers simultaneously with pivoting the pockets 23 to assure that the cover member is secured to the container in the adjusted position. As shown in FIG. 6, a sealing head, generally designated 50, is provided directly above the apex of cam member 42 so that the sealing operation is performed at the point of maximum adjustment of the space between containers. Preferably, sealing head 50 performs the sealing adjacent the longitudinal sides of the container and, for this purpose, is shaped for overlying the longitudinally extending portions of the container flange 16. The sealing head is advantageously made of heat-conductive material for a heat-sealing operation and has longitudinally extending ribs 51 and 52 which are preferably wider toward their base to provide a heat sink to assure sufficient heat for the sealing operation. The sealing head is mounted on a rotatable shaft 55 supported at one end by bearings 56 mounted on a bracket 57. The other end of the shaft 55 is supported by a similar bracket and bearing arrangement, and the brackets are supported on the machine in any convenient manner. Means in the form of air cylinder 58 (see FIG. 1) is advantageously provided for applying downward pressure on the sealing head 50 to depress the strip 21 and flange of the container 14 into the resilient material 24 on pockets 23. This tightens the web during sealing and produces a package having a tight-sealed cover 18.

A second sealing head, generally designated 60, is provided for sealing the cover sheet to the containers in the transverse direction. In the embodiment illustrated, sealing head 60 is made of heat-conductive material and conveniently has three sealing engagement means on its periphery for sealing covers on three consecutive containers. Each sealing engaging means is shaped for overlying the lateral flanges of two adjacent containers, and each includes a pair of laterally extending ribs 62, 64, as shown in FIGS. 4 and 6. These ribs are also preferably wider toward their base to provide a heat sink. To aid in the lateral or crosswise sealing, means in the form of air cylinder 61 (see FIG. 1) is provided for applying downward pressure on the sealing head 60 to depress the web and flanges of the container into the resilient portion 24 of the pockets 23. This tightens the web during sealing, as previously explained. As shown in FIG. 6, the rollers 29 pass over the cams 42, 42' and are again supported by the rails 32, 32' when the sealing operation by the second sealing head 60 is performed. In this manner, the containers are returned to their original spacing B for the lateral sealing operation. This is important since the spacing of the ribs 62 and 64 is fixed relative to each other. Sealing head 60 is provided with a sprocket 66 which is engaged by a plurality of spaced pins 67 provided on the pockets 23. It is deemed obvious that these pins are advanced with the pockets, and this arrangement provides a positive driving relationship between the sealing head 60 and the conveyor or pockets since the pins 67 are positively located on each pocket and do not become elongated from wear as in a chain and sprocket arrangement. In this manner, then, the sealing heal 60 is driven correlative to the speed of the conveyor, and each pair of ribs 62 and 64 is assured of proper engagement for the lateral sealing operation by virtue of the drive from the pockets and the fact that the pockets are returned to their original spacing prior to the lateral sealing.

It is contemplated that the sealing heads 50 and 60 may provide for heat-sealing, as in the embodiment illustrated, or for sealing a pressure-sensitive adhesive or a combination of the two. When provided for heat-sealing, the sealing heads 50 and 60 may be heated and have their heat controlled in any manner well known in the art. For one typical apparatus for this purpose and apparatus associated with the sealing head, reference is made to the aforementioned copending application.

After the sealing operation, the containers 14 are connected together by the continuous strip of material 21. As the connected containers are advanced by the conveyor, the web or strip 21 is pulled along with them, thereby feeding the strip for sealing to the following container. It is usually desirable to sever the connection between containers to provide individual packages. For this purpose, a cutting apparatus 70 is arranged between the second sealing head 60 and the outlet end of the machine, as shown in FIG. 1. The arrangement of the specific cutting apparatus does not constitute a part of the invention; however, reference is made to the aforementioned copending application for a detailed description of a suitable cutting apparatus.

Reference is now made to FIGS. 8–10, in which is illustrated the apparatus modified by an automatic control system. In the embodiment illustrated, the control system includes a sensing means for automatically detecting the alignment of the labels relative to the containers and means responsive to the sensing means to actuate the handle 48 and rotate shaft 45. It is contemplated that various types of sensing means may be utilized. In this instance, the sensing means is arranged for utilization with a generally transparent film or strip 21, and the indicator marks 19a are marks which block the passage of light. In the embodiment illustrated, the sensing means comprises a light source 101 and a photocell 102 which are mounted intermediate the vertically spaced rollers 38 and 39 and on either side of the strip 21. In this manner, the light from source 101 will be cut off from the photocell when the mark 19a passes therebetween. The source and photocell are conveniently mounted on bracket 37 as by arms 103 and 104, respectively. Of course, the relative positions of the light source and photocell may be reversed, if desired. The location of the source 101 and photocell 102 on the bracket 37 is selected so that the marks 19a interrupt the light beam when the labels are aligned with the containers within preselected limits. Physically speaking, the limits are indicated by switches 106 and 108 spaced as shown in FIG. 8. Esthetically speaking, the limits are such that the label 19, which may identify the product and include a brand name or the like, is located completely on the container 14 and is attractively placed thereon within reasonable longitudinal limits. The desired limits may vary depending on the size of the container 14, size of label 19, customer preference, and the like. As one example, however, a container having a six-inch longitudinal dimension may have a label which can vary one-quarter inch in either direction. In this example, then, switches 106 and 108 are spaced one-quarter inch on either side of perfect registry or spaced one-half inch apart, as shown in FIG. 8.

FIG. 10 is a schematic view of the circuitry of the automatic control system. Power is supplied from a source (not shown) through conductors 111 and 112, under the control of a main start switch (not shown). Light source 101 receives power through conductors 113 and 114 connected to a transformer 115. Transformer 115 has a primary 116 interposed in a conductor 117 extending between conductors 111 and 112, and a secondary 118 connected to conductors 113 and 114. Photocell 102 is connected to conductors 121 and 122 leading to photo-electric controls, generally designated 124, and including an amplifier and a relay. Controls 124 are connected to conductors 111 and 112 by conductor 125 and serves to operate a double-throw switch 126. The amplifier and relay operates the switch 126 between the position illustrated when the light from source 101 is interrupted to the position shown in phantom when the photocell 102 receives light from the source.

As shown, normally closed switch 106 is interposed in conductor 131 which extends between conductors 111 and 112. Also interposed in conductor 131 is a normally open switch 132 and a solenoid 133 which operates to close switch 132 when a circuit is completed. Normally open switch 108 and switch 126 are wired in parallel with switches 106 and 132 by means of conductors 134 and 135 connected to conductors 131 and 112, respectively. The other terminal of switch 126 is also wired in parallel to switch 106 by means of conductor 136 and the aforementioned conductor 134. A second solenoid 141 and a second normally open switch 142 are interposed in a conductor 143 extending between conductors 111 and 112. Switch 142 is operated by the first solenoid 133. Solenoid 141 is actuated when switch 142 is closed to complete a circuit and solenoid 141 then operates two-position valve 146 which controls the flow of air from a pressurized source S through conduits 147a and 147b to air cylinder 148. Actuation of the air cylinder operates the handle 48 (see the moved position shown in phantom in FIG. 8) and rotates shaft 45.

Assuming the label 19 to be in registry, and the indicator marks 19a intermediate the containers 14, the relative positions of roller 29 and switches 106 and 108 will be as indicated in FIG. 8 during one portion of the operation. Referring now to FIG. 10, switch 106 has been opened by roller 29, and indicator mark 19a has interrupted the light from source 101. As a result of this interruption, amplifier and relay 124 has moved switch 126 to the position shown. After indicator mark 19a passes the source, light will again be received by photocell 102 and switch 126 will be moved to its second position. Roller 29 thereafter operates to close normally open switch 108. It can be seen that when the film is in substantial registry, no circuit can be completed, and thus the air cylinder 148 is not operated. However, as explained above, the strip 21 has a built-in "lag" of the surface markings relative to the containers. As this "lag" increases, the interruption of the light source by indicator mark 19a and the actuation of normally open switch 108 by roller 29 will occur simultaneously. This will complete the parallel circuit through conductors 131, 134, and 135; causing solenoid 133 to close switches 132 and 142. Switch 132 completes a holding circuit along with normally closed switch 106. Closing of switch 142 completes a circuit through conductor 143, thereby actuating air cylinder 148 and rotating shaft 45. This cams the pockets 23 and increases the relative spacing of the containers 14 to a spacing greater than the spacing of the labels, thereby causing the labels to advance relative to the containers.

At this point, with the passage of each roller 29, switch 106 is opened; however, photocell 102 receives light, and switch 126 is in the position illustrated in phantom thereby completing the parallel circuit through conductors 134 and 136. Thus, the holding circuit remains until the advancement is such that the indicator 19a interrupts the source of light simultaneously with the opening of switch 106. At this point, the other limit of registry has been achieved, the holding circuit is broken, switches 132 and 142 are opened, and two-position valve 146 is returned to the illustrated position. This relieves the air from air cylinder 148, and handle 48 and shaft 45 are returned to their normal position. At this point, then, the spacing of the containers is slightly less than the center-to-center spacing of the labels, and the labels will again start to "lag" the containers toward the other limit of registry.

It is now deemed obvious that there has been provided a method and apparatus for properly positioning containers relative to a cover material having surface markings thereon and for sealing the cover material to the containers. The invention, in its broader aspects, is not limited to the specific steps and apparatus shown and described, but departures may be made therefrom without departing from the principles of the invention and without sacrificing its chief advantages.

What is claimed is:

1. A packaging apparatus for positioning containers in predetermined registry with surface markings on a continuous sheet of cover material and including: a plurality of spaced pockets for supporting a plurality of open-topped containers; means for swingably interconnecting said pockets about a transverse axis spaced from the top of the supported containers; means for advancing the pockets in a longitudinally extending row; means for feeding the continuous sheet of cover material to a position overlying the containers; and means for pivoting the pockets about said axis to change the spacing of said pockets at the tops thereof and thereby adjust the position of the containers relative to the cover material and effect registry with the surface markings.

2. A packaging apparatus as set forth in claim 1 including means for detecting the alignment of said surface markings relative to the container; and means responsive to said detecting means to automatically actuate said means for pivoting the pockets and compensate for variations in the longitudinal position of the container relative to the surface markings.

3. A packaging apparatus for positioning open-topped, rimmed containers in predetermined registry with surface markings on a sheet of cover material; said surface markings being generally located at a predetermined center-to-center spacing; the apparatus including: a plurality of generally equally spaced pockets having ends in juxtaposition and for supporting containers with their rims generally at the tops of the pockets; pivot means for pivotally connecting the juxtaposed ends of the pockets about an axis spaced from their tops; means for advancing the pockets in a longitudinally extending row; means for supporting the pockets in a generally horizontal plane as they are advanced; means for feeding the continuous sheet of cover material to a position overlying the containers; means for displacing the axis out of said plane to change the spacing of the tops of the containers and adjust their positions relative to the cover material to effect registry with the surface markings; and means for sealing the cover material to the rim of a container while the spacing is changed.

4. A packaging apparatus as set forth in claim 3 wherein the advancing means continuously advances the pockets; said last-mentioned means includes a rotary sealing head for longitudinally sealing the cover material to the rim; and including: means for returning the axis to said plane and returning the pockets to their original spacing, and a second rotary sealing head for subsequently sealing the cover material to the rim in a transverse direction.

5. A packaging apparatus as set forth in claim 3 wherein the pockets have an on-center spacing less than the center-to-center spacing of the surface markings; and wherein the means for displacing the axis changes the effective spacing of the tops of the containers to an amount greater than the center-to-center spacing of the surface markings.

6. A packaging apparatus as set forth in claim 3 wherein the sealing means is operative for sealing the cover material to the rim of a container with one of said surface markings in registry therewith within predetermined limits; and including means for detecting the alignment of the surface markings relative to the container; and means responsive to said detecting means to actuate said means for displacing the axis when the alignment is outside said predetermined limits.

7. A packaging apparatus as set forth in claim 3 wherein the means for supporting the pockets includes longitudinally extending rail means for supporting the pockets; and wherein the means for displacing the axis includes: cam means movable from an inoperative position below the rail means to an operative position above the rail means, and means for moving the cam means between said positions.

8. A packaging appartus for positioning open-topped containers in predetermined registry within predetermined limits with surface markings on a continuous sheet of cover material and including: a conveyor for advancing a number of the open-topped containers in a longitudinally extending row and uniformly spaced apart from each other; means for feeding the continuous sheet of cover material into position overlying the containers; a sealing head for sealing the cover material to the containers with the markings registered within predetermined limits with the tops of the containers; and means adjacent the sealing head for temporarily adjusting the spacing between the containers when the registry begins to stray belond the predetermined limits to move the containers with respect to the cover material and restore the registry within the predetermined limits.

9. The combination of claim 8 wherein the sealing head seals the cover material to the containers only in the longitudinal direction, and including a second sealing head for sealing the cover material to the containers in the transverse direction after the spacing between the container has been returned to the original spacing.

10. A packaging apparatus for positioning individual open-topped containers in predetermined registry with surface markings on a continuous sheet of cover material and including: a conveyor including a plurality of generally equally spaced pockets arranged in a longitudinal row and each for supporting an individual container; means for continuously advancing the conveyor in the longitudinal direction; means for feeding the continuous sheet of cover material to a position overlying the containers, and means for changing the spacing of two adjacent pockets to adjust the position of the containers relative to the cover material and effect registry with the surface markings.

References Cited

UNITED STATES PATENTS

| | | | |
|---|---|---|---|
| 2,083,617 | 6/1937 | Salfisberg | 53—51 X |
| 2,162,230 | 6/1939 | Salfisberg | 53—51 X |
| 2,420,982 | 5/1947 | Salfisberg | 53—51 X |
| 2,483,155 | 9/1949 | Salfisberg | 53—51 |
| 2,896,387 | 7/1959 | Brock. | |

(Other references on following page)

UNITED STATES PATENTS

| | | | |
|---|---|---|---|
| 3,035,380 | 5/1962 | Leavens | 93—34 X |
| 3,126,431 | 3/1964 | Harder | 53—51 X |
| 3,140,573 | 7/1964 | Buttolph | 53—51 |
| 3,238,691 | 3/1966 | Miller | 53—51 X |
| 3,267,639 | 8/1966 | Ollier | 53—51 |
| 2,648,183 | 8/1953 | Dalton | 53—389 |
| 2,975,574 | 3/1961 | Jorgenson | 53—287 |
| 3,151,428 | 10/1964 | Mader | 53—373 |
| 3,242,636 | 3/1966 | Evanson | 53—373 X |
| 3,267,639 | 8/1966 | Ollier | 53—51 |
| 3,397,508 | 8/1968 | Stroop | 53—184 |
| 3,427,778 | 2/1969 | McCluskey | 53—51 X |
| 3,436,894 | 4/1969 | Sorensen | 53—37 |

WAYNE A. MORSE, Jr., Primary Examiner

U.S. Cl. X.R.

53—65, 78, 287, 389; 93—34